(No Model.)
E. LAYEUX.
MECHANICAL MOVEMENT.
No. 545,166.  Patented Aug. 27, 1895.
Fig. 1.  Fig. 2.
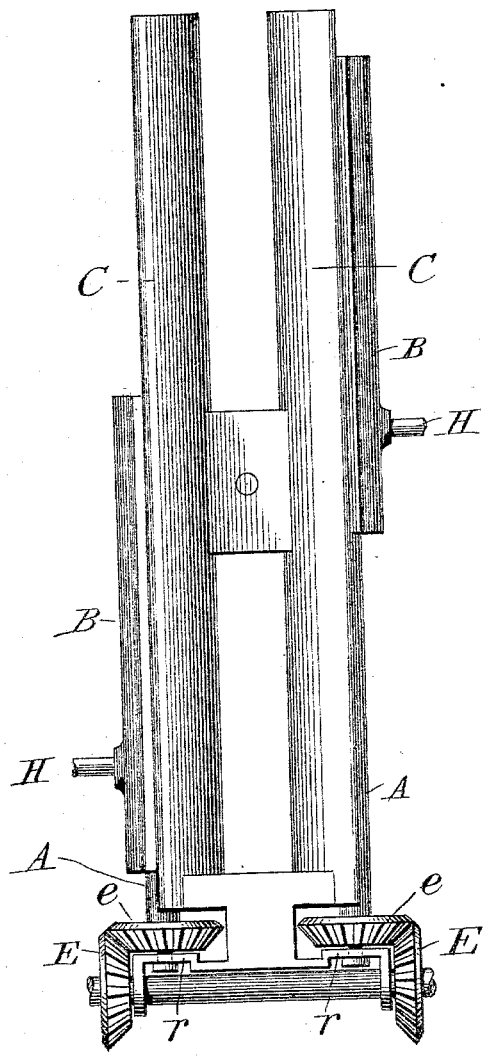
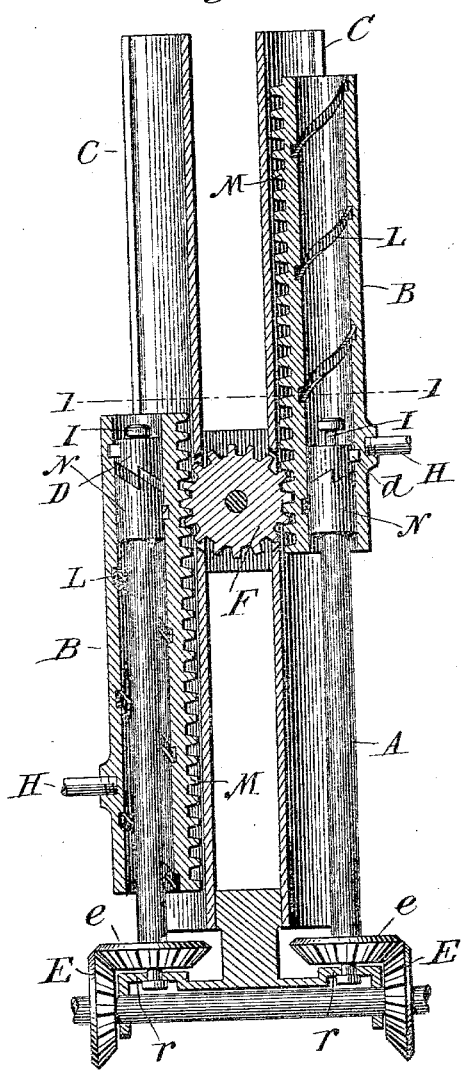
Fig. 3.
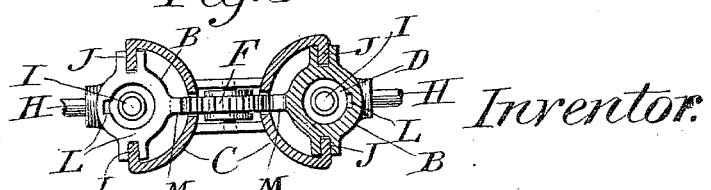
Witnesses:  Inventor.
Esery Layeux
William Hart

United States Patent Office.

ESERY LAYEUX, OF NEW BEDFORD, MASSACHUSETTS.

MECHANICAL MOVEMENT.

SPECIFICATION forming part of Letters Patent No. 545,166, dated August 27, 1895.

Application filed February 26, 1895. Serial No. 639,703. (No model.)

*To all whom it may concern:*

Be it known that I, ESERY LAYEUX, a subject of the Queen of Great Britain, residing at New Bedford, in the county of Bristol and State of Massachusetts, have invented certain new and useful Improvements in Mechanical Movements, of which the following is a specification.

My invention relates to that part of the mechanism of a bicycle by means of which it is propelled.

The accompanying drawings illustrate my invention, in which—

Figure 1 is a front view. Fig. 2 is a front view in vertical section. Fig. 3 is a plan view of a cross-section through the line 1 1.

Similar letters refer to like parts in the several views.

E E represent bevel-gears mounted on a shaft, said shaft having its bearings in a suitable frame, from which rise the semitubular uprights C C, provided with slides J J. Between the uprights C C, and about half-way of their length, is mounted a spur-gear F, having its teeth projecting through slots in the uprights C C.

A A are shafts having their lower ends resting in bearings in the frame r and provided with the bevel-gears e e, adapted to mesh with the gears E E, and their upper ends provided with the clutch-collars N rigidly secured to them, and the loose clutch-collars D adapted to turn easily and have a slight longitudinal motion on the reduced portion I of said shafts and provided with the lateral projections d.

B B are tubes adapted to snugly fit, yet move easily over the clutch-collars N, having their inside surfaces provided with the spiral grooves L, adapted to engage the projections d on the clutch-collars D. The outside surfaces of the tubes B are provided with longitudinal grooves adapted to engage the slides J J, the racks M adapted to mesh with the gear F and the projections H.

The operation is as follows: As each tube B is pushed down by means of force applied to the projections H, the opposite tube is caused to rise by means of the spur-gear F and the racks M. As each tube B commences to move downward, the clutch D engages with the clutch N, and as the downward movement is continued, the spiral grooves L engaging the projections d on the clutch D, cause the shaft A to revolve, and through the bevel-gears e and E give a continuous rotary motion in one direction to the shaft on which the gears E are mounted. As each tube B commences to rise the lift of the spiral L on the projections d disengages the clutch D, which allows it to turn freely in the opposite direction and follow the spiral of the groove L.

Having thus described my invention, what I claim, and desire to secure by Letters Patent, is—

A mechanical movement, consisting of a shaft having the bevel gears E, rigidly secured thereto; the upright shafts A, having their lower ends mounted in a suitable frame and provided with the bevel gears e, adapted to mesh with the bevel gears E, and their upper ends provided with the rigid clutches N, and the loose clutches D, having the projections d; the uprights C, C, arranged parallel with said shafts and provided with slides J, J, and having the spur gear F, mounted midway of, and between said uprights, with its teeth projecting through slots in said uprights; the tubes B, having their outer surfaces provided with longitudinal grooves adapted to engage the slides J, J, and having racks M, adapted to engage the spur gear F, and having projections H, and having their inside surfaces provided with spiral grooves L, adapted to engage the projections d, on the clutches D, whereby when the tubes B, are caused to move alternately up and down on the slides J, J, the shaft on which the gears E, are mounted, is caused to continuously revolve in one direction, as shown and described.

In testimony whereof I have signed my name to this specification, in the presence of two subscribing witnesses, on this 27th day of December, A. D. 1894.

ESERY LAYEUX.

Witnesses:
ZUTICK HERAUX,
WILLIAM HART.